US012146418B2

(12) United States Patent
Wittmer et al.

(10) Patent No.: US 12,146,418 B2
(45) Date of Patent: Nov. 19, 2024

(54) ROTOR BLADE AND ROTOR BLADE ASSEMBLY FOR A TURBOMACHINE

(71) Applicant: MTU Aero Engines AG, Munich (DE)

(72) Inventors: Jens Wittmer, Pfaffenhofen a. d. Ilm (DE); Markus Uecker, Munich (DE); Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/217,786

(22) Filed: Jul. 3, 2023

(65) Prior Publication Data

US 2024/0018874 A1 Jan. 18, 2024

(30) Foreign Application Priority Data

Jul. 12, 2022 (DE) ......................... 102022117268.6

(51) Int. Cl.

*F01D 5/14* (2006.01)
*F01D 5/30* (2006.01)
*F01D 11/00* (2006.01)

(52) U.S. Cl.

CPC ........... *F01D 5/143* (2013.01); *F01D 5/3007* (2013.01); *F01D 11/001* (2013.01); *F05D 2250/141* (2013.01); *F05D 2250/711* (2013.01)

(58) Field of Classification Search

CPC ........ F01D 11/00; F01D 11/001; F01D 5/143; F01D 5/225; F05D 2250/141; F05D 2250/322; F05D 2250/611; F05D 2250/711–713; F05D 2260/941; F05D 2240/80; F05D 2220/323

See application file for complete search history.

(56) References Cited

U.S. PATENT DOCUMENTS 5,397,215 A * 3/1995 Spear .................... F04D 29/321 416/193 A
5,466,123 A * 11/1995 Rose ........................ F01D 5/143 415/914
6,561,761 B1 * 5/2003 Decker ................... F01D 5/143 415/173.1
8,297,935 B2 * 10/2012 Mitlin ........................ F01D 5/18 416/223 R
9,334,745 B2 * 5/2016 Miyoshi .................. F01D 9/041
10,030,523 B2 * 7/2018 Quach ........................ F01D 5/18
10,577,955 B2 3/2020 Shirley et al.

(Continued)

FOREIGN PATENT DOCUMENTS

EP 2 937515 A1 10/2015
FR 3107301 A1 8/2021

*Primary Examiner* — Brian P Wolcott
(74) *Attorney, Agent, or Firm* — Davidson Kappel LLC

(57) ABSTRACT

A rotor blade (20) for a rotor blade assembly (10) of a turbomachine (1) is provided, having an inner rotor blade platform (40) which extends axially from the rotor blade (20) with respect to a longitudinal turbomachine axis (2) and has two opposite circumferential end faces (41) and a free axial end (42) whose cross section is radially inwardly and radially outwardly bounded by circular arcs of two concentric circles. The inner rotor blade platform (40) has a cross section of connection (45) with the rotor blade (20) which is bounded radially inwardly by an inner connecting line (46) and radially outwardly by an outer connecting line (47). Each of the connecting lines (46, 47) has a central portion (61) having a convex curvature.

18 Claims, 4 Drawing Sheets

(56) References Cited

U.S. PATENT DOCUMENTS

| | | | | |
|---|---|---|---|---|
| 10,920,599 | B2 * | 2/2021 | Adhate | F01D 5/143 |
| 11,867,065 | B2 * | 1/2024 | Garreau | F01D 11/001 |
| 2013/0089430 | A1 * | 4/2013 | Stein | F01D 5/145<br>416/235 |
| 2023/0068236 | A1 * | 3/2023 | Garreau | F01D 11/001 |

* cited by examiner

ROTOR BLADE AND ROTOR BLADE ASSEMBLY FOR A TURBOMACHINE

This claims the benefit of German Patent Application DE 102022117268.6, filed on Jul. 12, 2022, which is hereby incorporated by reference herein.

BACKGROUND

The invention relates to a rotor blade for a rotor blade assembly of a turbomachine, having an inner rotor blade platform which extends axially from a rotor blade with respect to a longitudinal turbomachine axis and has two opposite circumferential end faces and a free axial end whose cross section is radially inwardly and radially outwardly bounded by circular arcs of two concentric circles, the inner rotor blade platform having a cross section of connection with the rotor blade which is bounded radially inwardly by an inner connecting line and radially outwardly by an outer connecting line.

A turbomachine is functionally divided into a compressor, a combustor and a turbine. Intake air is compressed by the compressor and mixed and burned with fuel in the downstream combustor. The resulting hot gas, a mixture of combustion gas and air, flows through the downstream turbine and is expanded therein. The turbine is typically made up of a plurality of stages, each including a stator and a rotor, the rotors or their rotor blade assemblies being driven by the hot gas. In each stage, a portion of the internal energy is removed from the hot gas and converted into motion of the respective rotor blade assembly and thereby of a shaft of the turbomachine.

Inner rotor blade platforms (blade wings) are used in a turbomachine to seal between the rotatable rotor blade assembly and the stator or its structures, which are disposed upstream and downstream of the rotatable rotor blade assembly. Such an inner rotor blade platform extends in the circumferential direction axially and axially from a rotor blade body and cooperates with suitable structures of the stator. The inner rotor blade platform is disposed in the region of the blade root and reduces or prevents air leakage from the primary air flow of the turbomachine.

SUMMARY OF THE INVENTION

Due to the rotation of the rotor blade assembly, the inner rotor blade platform, which may be abstracted as a beam that is clamped at one end, is subjected during operation to centrifugal loading and is mainly loaded in bending. Known designs of inner rotor blade platforms are embodied in the form of rough castings, where only the axial extent is adjusted by machining. Due to the centrifugal loading, the inner rotor blade platforms must be locally stiffened, which is usually accomplished by means of a wedge shape and/or by pads incorporated in the casting. These are located on the underside of the inner rotor blade platform and may be arranged both at the circumferential ends and in the middle of the circumferential extent of inner rotor blade platforms. The resulting increase in the area moment of inertia of the inner rotor blade platform counteracts the bending load and thus assists in stabilizing the rotor blade. However, the resulting increase in the blade mass also has a negative effect on the blade root load and the rotor load.

In view of the above, it is an object of the present invention to provide an improved rotor blade for a rotor blade assembly of a turbomachine, which is in particular more robust against loads caused by centrifugal forces occurring during operation. Another object is to provide an improved rotor blade assembly.

The present invention provides a rotor blade for a rotor blade assembly of a turbomachine, having an inner rotor blade platform which extends axially from the rotor blade, in particular from a neck portion of the rotor blade, with respect to a longitudinal turbomachine axis and has two opposite circumferential end faces, which are in particular configured identically in shape and position relative to the axis of rotation or longitudinal turbomachine axis, and a free axial end whose cross section is radially inwardly and radially outwardly bounded by circular arcs of two concentric circles. The inner rotor blade platform has a cross section of connection with the rotor blade which is bounded radially inwardly by an inner connecting line and radially outwardly by an outer connecting line. Each of the connecting lines has a central portion having a convex curvature toward the blade root of the rotor blade or toward the airfoil, in particular a concave curvature toward the airfoil or toward the blade root, the central portion in particular extending up to the respective circumferential end faces. The cross section of the inner rotor blade platform extends continuously from the cross section of connection with the rotor blade in a direction toward the free axial end of the inner rotor blade platform. In some embodiments, further portions may adjoin the central portion, in particular on both sides, so that it does not extend up to the respective circumferential end faces.

The geometry of the connecting lines defines the cross section of connection radially inwardly and radially outwardly, whereby an in particular radially inwardly formed depression or an in particular radially outwardly formed bulge or bead is formed in the inner rotor blade platform in the circumferential direction between its circumferential end faces, whose shape is defined in particular by the central portion. Since the cross section of the inner rotor blade platform extends continuously from the cross section of connection with the rotor blade in a direction toward the free axial end of the inner rotor blade platform, the depression or the bulge is oriented axially and, thus, can contribute to the stabilization of the inner rotor blade platform. In this connection, the statement that "the cross section of the inner rotor blade platform extends continuously from the cross section of connection with the rotor blade in a direction toward the free axial end of the inner rotor blade platform" means that the cross section of the inner rotor blade platform merges in a continuously changing manner from the cross section of connection with the rotor blade into the cross section of the free axial end of the inner rotor blade platform.

The shape of the cross section of connection and of the thereby defined bead allows the rotor blade to be stiffened in the connecting region between the inner rotor blade platform and the rotor blade. This also makes it possible to increase the robustness against bending loads and, thus, to increase the service life of the rotor blade. The circumferential end faces are in particular configured such that no step; i.e., a smooth transition, is formed between two adjacent circumferential end faces of two adjacent rotor blades in order to facilitate rotation without disturbance or turbulence. For this purpose, the circumferential end faces may be configured identically and/or configured to correspond to each other in shape and position relative to the longitudinal turbomachine axis or axis of rotation.

A turbomachine has a casing permitting axial flow therethrough and having mounted thereto at least one stator vane, in particular a plurality of stator vanes arranged adjacent to one another in the circumferential direction and radially to an axis of rotation of the turbomachine or with respect to the casing (stator). At its end directed toward the axis of rotation of the turbomachine, a radially extending rotor blade has a blade root where the rotor blade is removably or permanently attached to a rotor or a rotor disk. In addition, a blade tip is disposed at the radially outer end of a rotor blade, an airfoil of the rotor blade being formed between the blade root and the blade tip.

The terms “axial,” “radial,” and “circumferential” as well as the corresponding directions (axial direction, etc.) refer to the axis of rotation or turbomachine axis about which the blade or rotor blade rotates during operation. This axis typically coincides with a longitudinal axis of the turbomachine. The radial direction is in all points a direction orthogonal to and through the axis of rotation; the circumferential direction is in all points a direction orthogonal to the radial direction and to the axis of rotation. A cross section of the turbomachine lies in a plane orthogonal to the axis of rotation. Finally, the “upstream” and “downstream” directions are relative to the general direction of flow of the air or gases or of a primary flow in the turbomachine along the turbomachine axis.

An inner rotor blade platform may extend axially upstream from a rotor blade and may in particular be disposed at a transition from the airfoil to the blade root or on the blade root so as to cooperate with a sealing device disposed on a stator structure. This makes it possible to obtain a sealing effect with respect to the primary flow of the turbomachine in order to avoid false air flows, which may have a negative effect on a performance of the turbomachine. In this connection, the inner rotor blade platform has a cross section of connection via which the inner rotor blade platform is connected to the rotor blade, as well as a free axial end disposed opposite to the cross section of connection. In addition, the inner rotor blade platform has two opposite circumferential end faces, each connecting the cross section of connection with the rotor blade to the free axial end of the inner rotor blade platform. The circumferential end faces may be formed by cross sections bounded by straight or uncurved lines or by curved lines. In addition, the inner rotor blade platform has a thickness or an extent in the radial direction which may change, in particular decrease, from the cross section of connection toward the free axial end. The curvature may be defined by any suitable geometric shape, and in particular may also have a curved transition from one shape to another, such as in particular an elliptical or circular curve section.

The invention is based, inter alia, on the consideration that the typical load to which an inner rotor blade platform is exposed is greatest in a central region at the transition from the inner rotor blade platform to the rotor blade and decreases in a circumferential direction along the cross section of the inner rotor blade platform and toward the axial end of the inner rotor blade platform.

The invention is based on the idea of configuring a geometry at the transition and in a region of the inner rotor blade platform proximal to the airfoil in such a way that an area moment of inertia can be increased at least in a region proximal to the cross section of connection with the rotor blade. The convex curvature toward the blade root of the rotor blade may in particular be formed symmetrically with respect to a centerline of the inner rotor blade platform. Thus, in a region of connection with the rotor blade, the inner rotor blade platform may be provided with a cross section of connection that is in particular symmetrical with respect to a radial centerline of the inner rotor blade platform and which has a bead across the circumferential direction, which bead is provided or formed by the central portion and is capable of counteracting loading of the inner rotor blade platform.

The invention also has the advantage over an assembly having a pad as a stabilizing element that it does not result in a significant increase in the mass of the inner rotor blade platform or of the rotor blade.

In an embodiment, each of the connecting lines has two straight portions, each merging tangentially into the central portion and extending it toward the respective circumferential end faces, the straight portions having an uncurved shape. The depression or bulge in the cross section of connection is continued in the circumferential direction by the straight portions and enables a load-adapted geometry, in particular depending on a slope of the straight portions. The straight portions disposed adjacent the central portion make it possible to improve a stabilization effect against such loads.

By dividing the connecting lines, which connect respective radially outer or radially inner end points of the circumferential end faces, into differently shaped portions, in particular the central portion and the straight portions, the load resistance can be adapted to the particular requirements. Since the two mentioned portions of the connecting lines merge into one another tangentially or mathematically smoothly, i.e. without kinks, it is possible to prevent or reduce unwanted turbulences in the gas stream.

In an embodiment, the straight portions of the connecting lines extend up to the respective circumferential end faces. This makes it possible to create a simple bead geometry, which may in particular simplify a manufacturing process and/or a design process for the inner rotor blade platform.

In an embodiment, the straight portions of the connecting lines each merge tangentially into a curvature portion, which extends the straight portion toward the respective circumferential end face, the curvature portions having a curved shape. The curvature portion may at least regionally have at least one radius, no, one, or a plurality of inflection points, and may have a right-handed curvature and/or a left-handed curvature. As a result, a bead geometry can be adapted to specific load requirements.

In an embodiment, the curvature portions extend up to the respective circumferential end faces. Thus, the connecting line or the connecting lines may have three geometrically different shapes in the circumferential direction in order to allow a cross section of connection or a geometry of the inner rotor blade platform to be adapted to the inertia requirements occurring during operation of the turbomachine.

In an embodiment, the straight portions or the curvature portions each merge tangentially into an end portion, which extends the straight portion or the curvature portion toward the respective circumferential end face, the respective end portion in particular having the curvature of the circular arc of the free axial end or a curvature of a circle about the longitudinal turbomachine axis. A circular arc-shaped circumferential configuration that is constant over the axial extent of the inner rotor blade platform enables an aerodynamically favorable design for rotation of the rotor blade.

In an embodiment, the end portions extend up to the respective circumferential end faces. This configuration of the respective end portions allows for aerodynamic continuity of two adjacent inner rotor blade platforms.

In an embodiment, the cross section of the inner rotor blade platform extends continuously from the cross section of connection up to the free axial end of the inner rotor blade platform. As described earlier, the statement that “the cross section of the inner rotor blade platform extends continuously from one region to another" defines that the cross section of the inner rotor blade platform merges in a continuously changing manner from one region into the cross section of the other region. Accordingly, in this embodiment, the bead geometry defined by the cross section of connection extends continuously up to the free axial end, and its shape defined at the cross section of connection continuously decreases in size toward the free end, where it has the defined free cross section. In this way, an aerodynamically favorable design is created and an inertia-reducing effect of the bead geometry is improved.

In an embodiment, the cross section of the inner rotor blade platform extends continuously from the cross section of connection up to 80%, 85%, 90%, or 95% of a longitudinal extent of the inner rotor blade platform in the direction of the free axial end and has the cross section of the free axial end over the remaining 20%, 15%, 10%, or 5%. In each cross-sectional plane of the remaining cross section, the inner rotor blade platform is radially inwardly and radially outwardly bounded in particular by circular arcs of two concentric circles whose common center coincides with the axis of rotation of the turbomachine. In particular, the remaining constant cross section may extend over 0.5 mm, 1 mm, 1.5 mm, or 2 mm of the axial longitudinal extent of the inner rotor blade platform. This makes it possible to make use of favorable aerodynamic properties of the circular arc shape and to avoid disturbance flows during operation of the turbomachine.

In an embodiment, the inner and outer connecting lines have a substantially identical sequence of portions. In particular, the portions of the inner and outer connecting lines have equal lengths, curvatures and/or slopes in order to form a uniform and/or symmetrical connecting portion.

In an embodiment, the inner and outer connecting lines are substantially parallel to and offset from one another. Thus, a thickness of the inner rotor blade platform can be designed to be constant over the circumferential extent in order to avoid loads due to non-uniform mass distribution during rotation.

In an embodiment, an extremum of the central portion has a predetermined distance from a radially outer end of the circumferential end faces that is equal to, greater than, or less than a distance of the connecting lines from each other. This enables a rugged design of the inner rotor blade platform since the thickness of the inner rotor blade platform can be configured to be homogeneous.

In in embodiment, the extremum is located in the middle of a circumferential extent of the inner rotor blade platform, whereby a uniform load distribution over the circumferential extent of the inner rotor blade platform can be achieved.

In accordance with a second aspect of the invention, there is provided a rotor blade assembly having at least one rotor blade as described herein. Such a rotor blade assembly has a plurality of circumferentially distributed rotor blades which may be removably or permanently attached to a rotor or rotor disk, in particular by a material-to-material bond, and may in particular be formed integrally therewith. A rotor blade assembly designed in this way can withstand operational loads better, and therefore may have a longer service life.

BRIEF DESCRIPTION OF THE DRAWINGS

Further features, advantages, and possible applications of invention will be apparent from the following description taken in conjunction with the drawings, in which.

DETAILED DESCRIPTION

Figure 1:
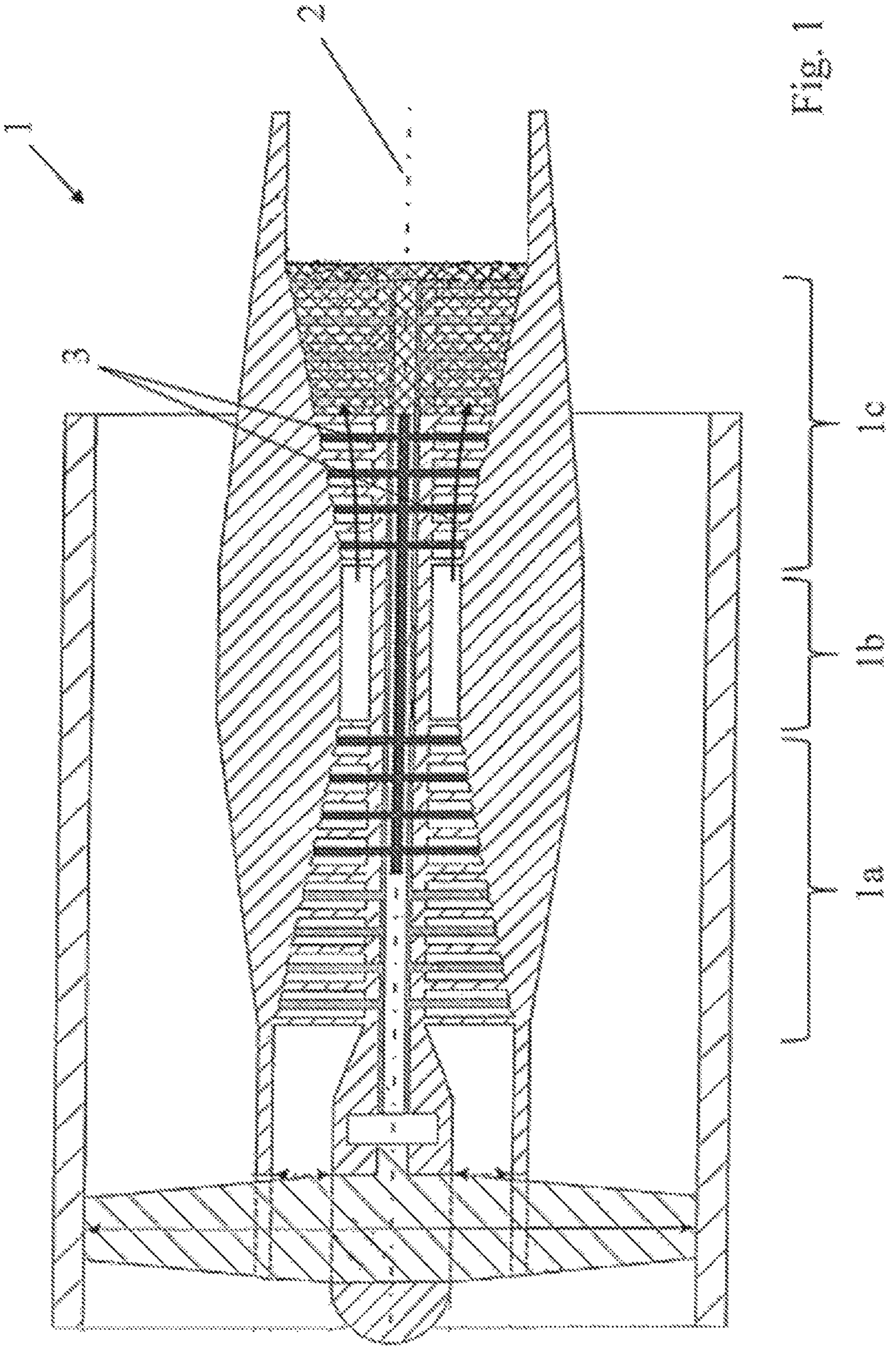
FIG. 1 is a schematic view of an exemplary turbomachine.

FIG. 1 shows, in axial section, an exemplary embodiment of an inventive turbomachine 1, here, by way of example, a turbofan engine. Turbomachine 1 is functionally divided into a compressor 1*a*, a combustor 1*b*, and a turbine 1*c*. Both compressor 1*a* and turbine 1*c* are made up of a plurality of stages. Each stage is composed of a rotor blade assembly and a stator vane assembly disposed downstream thereof. Such a turbine stage, in particular a low-pressure turbine stage, in particular a high-speed low-pressure turbine stage, may have a rotor blade according to the invention and/or a rotor blade assembly according to the invention.

During operation, the rotor blade assemblies rotate about the longitudinal axis or axis of rotation 2 of turbomachine 1. The intake air is compressed in compressor 1*a*, and is then mixed and burned with fuel in the downstream combustor 1*b*. The resulting flow (primary flow) flows through a hot gas path 3, thereby driving the rotor blade assemblies disposed therein, which rotate about axis of rotation 2.

Figure 2:
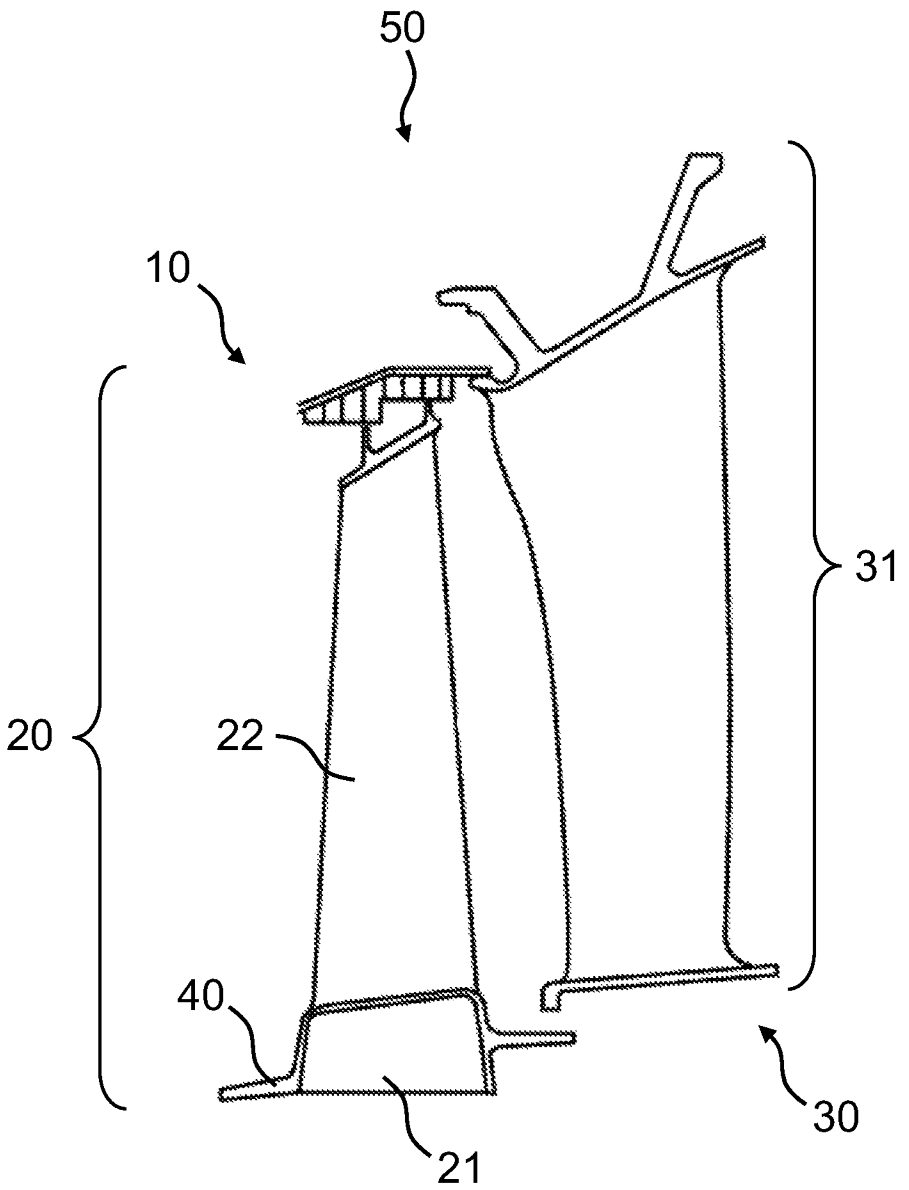
FIG. 2 is a schematic view of an exemplary turbine stage having an exemplary rotor blade according to the invention.

FIG. 2 shows, in schematic view, an exemplary embodiment of a turbine stage 50 with an inventive rotor blade assembly 10 having a plurality of circumferentially distributed rotor blades 20 according to the invention. The rotor blade 20 shown has an airfoil 22, a blade root 21 at its radially inward end, and an inner rotor blade platform 40 in the region of blade root 21, the inner rotor blade platform 40 extending from rotor blade 20 in an axially upstream direction with respect to a longitudinal turbomachine axis 2. The turbine stage has, adjacent to and downstream of rotor blade assembly 10 (to the right in FIG. 2), a stator vane assembly 30 having a plurality of circumferentially distributed stator vanes 31 and being disposed adjacent to rotor blade assembly 10.

Figure 3:
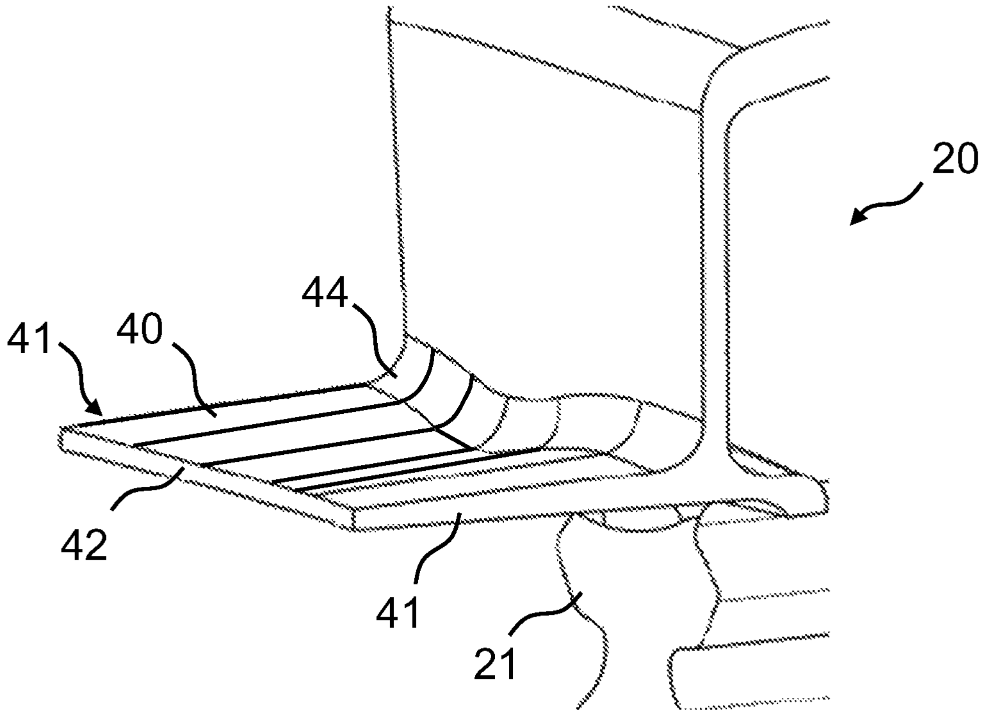
FIG. 3 is a schematic perspective detail view of an exemplary rotor blade according to the invention.

FIG. 3 shows, in schematic view, a detail of an exemplary embodiment of an inventive rotor blade 20 in the region of blade root 21. An inner rotor blade platform 40 extends axially from rotor blade 21 with respect to a longitudinal turbomachine axis 2. Rotor blade 20 and inner rotor blade platform 40 are connected to each other at a cross section of connection (shown in FIG. 4).

Inner rotor blade platform 40 has two opposite circumferential end faces 41 and a free axial end 42. The cross section of free axial end 42 is radially inwardly and radially outwardly bounded by circular arcs of two concentric circles whose centers coincide with longitudinal axis 2 of turbomachine 1. The cross section of inner rotor blade platform 40 extends continuously from the cross section of connection with rotor blade 20 in a direction toward free axial end 42 of inner rotor blade platform 40; in the exemplary embodiment shown, up to free axial end 42 of inner rotor blade platform 40. In some exemplary embodiments, the cross section of inner rotor blade platform 40 may extend continuously from the cross section of connection up to 80%, 85%, 90%, or 95% of the longitudinal extent of inner rotor blade platform 40 in the direction of free axial end 42. The remaining 20%, 15%, 10%, or 5% of the longitudinal extent of inner rotor blade platform 40 have the cross section of free axial end 42, which cross section is thus bounded by circular arcs of two concentric circles.

In the region of connection between rotor blade 20 and inner rotor blade platform a fillet 44 may be formed to enable a convenient transition between rotor blade 20 and inner rotor blade platform 40.

Figure 4:
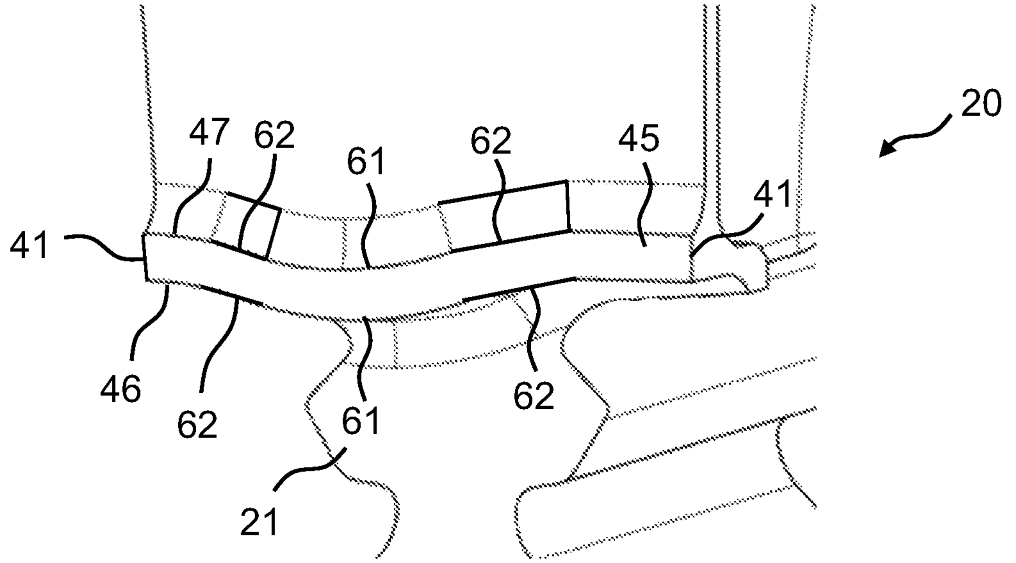
FIG. 4 is a schematic sectional view of the exemplary inventive rotor blade of FIG. 3.

FIG. 4 shows another detail of the exemplary embodiment of the inventive rotor blade 20 of FIG. 3 in a schematic sectional view taken in a plane of a cross section of connection between rotor blade 20 and inner rotor blade platform 40.

Inner rotor blade platform 40 has a cross section of connection 45 with rotor blade which is bounded radially inwardly by an inner connecting line 46 and radially outwardly by an outer connecting line 47. In the circumferential direction, the cross section of connection 45 is bounded by the opposite circumferential end faces 41. Circumferential end faces 41 are here configured identically in shape and position relative to the axis of rotation, so that two adjacent circumferential end faces 41 may have a stepless transition contour, thus promoting smooth rotation of the rotor blade assembly. The two connecting lines 46, 47 each have a central portion 61 having a convex curvature toward blade root 21 of rotor blade 20. Disposed adjacent the two ends of central portion 61 are straight portions 62, each merging tangentially into the central portion 61 and extending it toward the respective circumferential end faces 41. Straight portions 62 have an uncurved shape; i.e., the straight portions have no curvature. The bead defined by the cross section of connection may increase an area moment of inertia of rotor blade 20 in the region of inner rotor blade platform 40 and thus increase a strength of rotor blade 20 in order to prolong a service life.

Connecting lines 46, 47 may have, in addition to the central portion and the straight portions, additional portions, which will be further illustrated with reference to various exemplary embodiments in the following description for FIGS. 5*a* through 5*d*. Here, connecting lines 46, 47 have substantially identical sequences of portions, which are at least regionally parallel to and offset from one another.

Figure 5A:
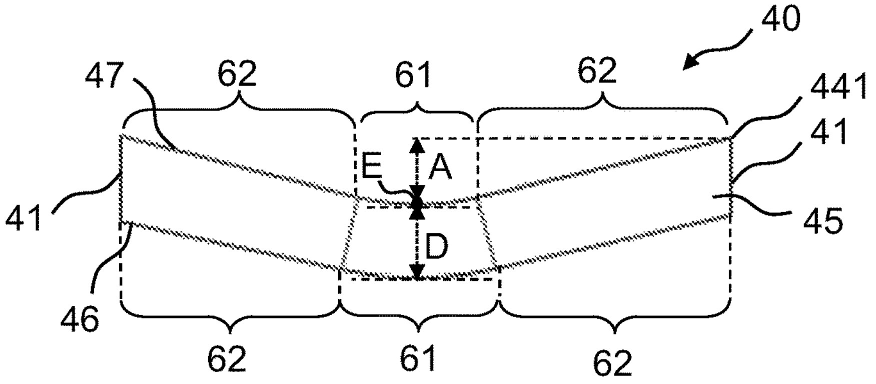
FIGS. 5*a* through 5*d* are schematic cross-sectional views of different exemplary embodiments of inner rotor blade platforms of rotor blades according to the invention.

FIG. 5*a* shows a first exemplary embodiment of an inventive rotor blade 20 in a schematic sectional view taken in a plane of a cross section of connection 45 between rotor blade 20 and inner rotor blade platform 40.

Each of the two connecting lines 46, 47 has a central portion 61 having a convex curvature toward blade root 21 of rotor blade 20. Connecting lines 46, 47 each have two straight portions 62 adjoining central portion 61 and extending it toward the respective circumferential end faces. In the exemplary embodiment shown, each of the straight portions 62 extends up to the respective circumferential end face 41. A transition between central portion 61 and straight portions 62 is tangentially or mathematically smooth or continuous, i.e., has no kink or break.

An extremum E of central portion 61 of connecting line 47 may have a distance A from a radially outer end 441 of circumferential end faces 41 that is equal to, greater than, or less than a distance D of connecting lines 46, 47 from each other.

Figure 5B:
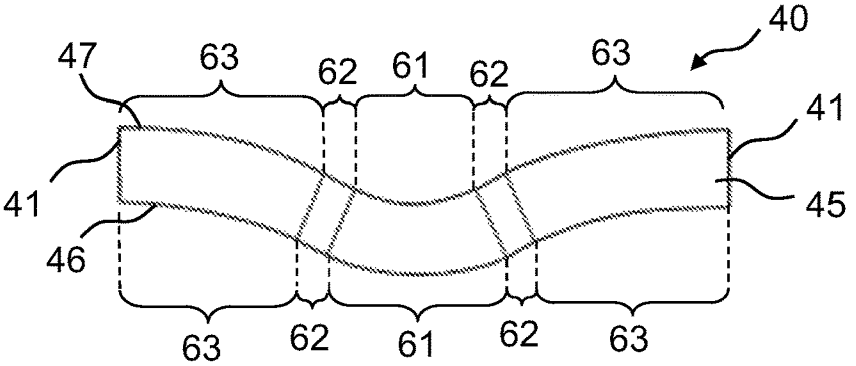

FIG. 5*b* shows a second exemplary embodiment of an inventive rotor blade 20 in a schematic sectional view taken in a plane of a cross section of connection 45 between rotor blade 20 and inner rotor blade platform 40.

Each of connecting lines 46, 47 has a central portion 61 and straight portions 62 adjoining central portion 61 and extending it toward the respective circumferential end faces. Straight portions 62 each merge tangentially into a curvature portion 63, which extends the respective straight portion 62 toward the respective circumferential end face 41. Curvature portions 63 have a right-handed curvature or at least one concave curvature toward a blade root 21 of rotor blade 20 and extend up to the respective circumferential end faces 41. The concave curvature may include a circular arc about a center radially spaced from connecting line 46, 47.

Figure 5C:
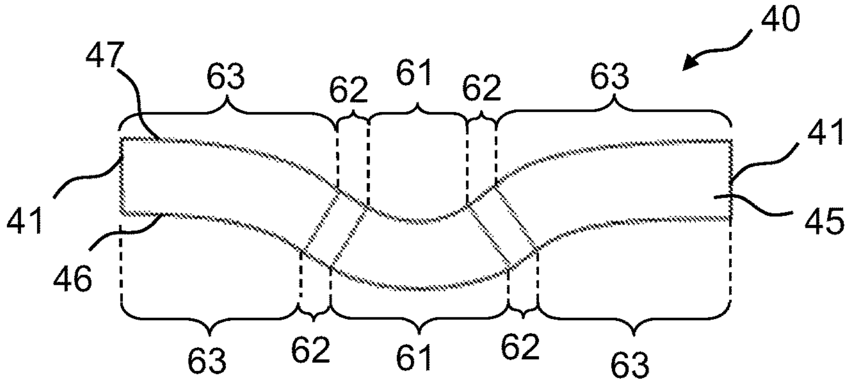

FIG. 5*c* shows a third exemplary embodiment of an inventive rotor blade 20 in a schematic sectional view taken in a plane of a cross section of connection 45 between rotor blade 20 and inner rotor blade platform 40.

Each of connecting lines 46, 47 has a central portion 61 and straight portions 62 adjoining central portion 61 and extending it toward the respective circumferential end faces. Straight portions 62 each merge tangentially into a curvature portion 63, which extends the respective straight portion 62 toward the respective circumferential end face 41. Curvature portions 63 have a concave curvature, which may, for example, follow an elliptical curve.

Figure 5D:
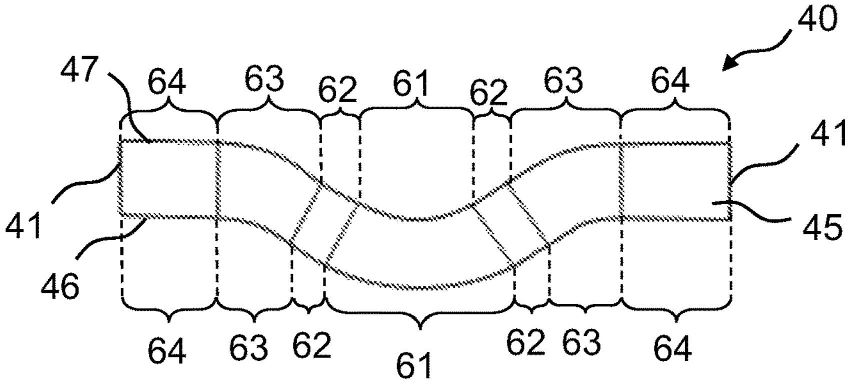

FIG. 5*d* shows a fourth exemplary embodiment of an inventive rotor blade 20 in a schematic sectional view taken in a plane of a cross section of connection 45 between rotor blade 20 and inner rotor blade platform 40.

Each of connecting lines 46, 47 has a central portion 61 and straight portions 62 adjoining it. Straight portions 62 each merge tangentially into a curvature portion 63. In the exemplary embodiment shown, curvature portions 63 each merge tangentially into an end portion 64, which extends the curvature portion 63 toward the respective circumferential end face 41. In the exemplary embodiment shown in FIG. 5*d*, the respective end portion 64 has the curvature of the circular arc that bounds free end 42 radially inwardly and radially outwardly.

LIST OF REFERENCE NUMERALS

- 1 turbomachine
- 1*a* compressor
- 1*b* combustor
- 1*c* turbine
- 2 axis of rotation or turbomachine axis
- 3 hot gas path
- 10 rotor blade assembly
- 20 rotor blade
- 21 blade root
- 22 airfoil
- 30 stator vane assembly
- 31 stator vane
- 40 inner rotor blade platform
- 41 circumferential end face
- 42 free axial end
- 44 fillet
- 45 cross section of connection
- 46, 47 connecting line
- 50 turbine stage
- 61 central portion
- 62 straight portion
- 63 curvature portion
- 64 end portion
- 441 radially outer end of the circumferential end face
- A distance of the extremum from a radially outer end of the circumferential end faces
- E extremum
- D distance between the connecting lines or thickness of the inner rotor blade platform

What is claimed is:

1. A rotor blade for a rotor blade assembly of a turbomachine, the rotor blade comprising:

an inner rotor blade platform extending axially from the rotor blade with respect to a longitudinal turbomachine axis and has two opposite circumferential end faces and a free axial end whose cross section is radially inwardly and radially outwardly bounded by circular arcs of two concentric circles, wherein the inner rotor blade platform has a cross section of connection with the rotor blade, the cross section of connection bounded radially inwardly by an inner connecting line and radially outwardly by an outer connecting line, each of the inner and outer connecting lines:

having a central portion having a convex curvature toward the blade root of the rotor blade or toward the airfoil; and wherein the cross section of the inner rotor blade platform extends continuously from the cross section of connection with the rotor blade in a direction toward the free axial end of the inner rotor blade platform;

wherein each of the inner and outer connecting lines has two straight portions, each merging tangentially at one circumferential end into the central portion and at an other circumferential end extending toward a respective circumferential end face of the two circumferential end faces, the straight portions having an uncurved shape, a respective curvature portion having a curved shape being located between the other circumferential end and the respective circumferential end face.

2. The rotor blade as recited in claim 1 wherein the straight portions each merge tangentially into the respective curvature portion, the respective curvature portion extending each straight portion toward the respective circumferential end face.

3. The rotor blade as recited in claim 2 wherein the curvature portions extend up to the respective circumferential end faces.

4. The rotor blade as recited in claim 1 wherein the curvature portions which merge with the straight portions each merge tangentially into a respective straight end portion extending the respective curvature portion toward the respective circumferential end face.

5. The rotor blade as recited in claim 4 wherein each respective straight end portion has a curvature of a circle about the longitudinal turbomachine axis.

6. The rotor blade as recited in claim 4 wherein the each respective straight end portion extends up to a corresponding respective end face.

7. The rotor blade as recited in claim 1 wherein the cross section of the inner rotor blade platform extends continuously from the cross section of connection up to the free axial end of the inner rotor blade platform.

8. The rotor blade as recited in claim 1 wherein the cross section of the inner rotor blade platform extends continuously from the cross section of connection up to 80% of a longitudinal extent of the inner rotor blade platform in the direction of a free axial end and has the cross section of the free axial end over the remaining 20%.

9. The rotor blade as recited in claim 8 wherein the cross section of the inner rotor blade platform extends continuously from the cross section of connection up to 85% of a longitudinal extent of the inner rotor blade platform in the direction of the free axial end and has the cross section of the free axial end over the remaining 15%.

10. The rotor blade as recited in claim 9 wherein the cross section of the inner rotor blade platform extends continuously from the cross section of connection up to 90% of a longitudinal extent of the inner rotor blade platform in the direction of the free axial end and has the cross section of the free axial end over the remaining 10%.

11. The rotor blade as recited in claim 10 wherein the cross section of the inner rotor blade platform extends continuously from the cross section of connection up to 95% of a longitudinal extent of the inner rotor blade platform in the direction of the free axial end and has the cross section of the free axial end over the remaining 5%.

12. The rotor blade as recited in claim 1 wherein the inner and outer connecting lines have an identical sequence of portions including the central portion.

13. The rotor blade as recited in claim 1 wherein portions of the inner and outer connecting lines, including the central portion, are at least regionally parallel to and offset from one another.

14. The rotor blade as recited in claim 1 wherein an extremum of the central portion has a predetermined distance from a radially outer end of the circumferential end faces equal to or greater than a distance of the connecting lines from each other.

15. The rotor blade as recited in claim 1 wherein an extremum of the central portion has a predetermined distance from a radially outer end of the circumferential end faces equal to or less than a distance of the connecting lines from each other.

16. The rotor blade as recited in claim 1 wherein an extremum of the central portion is located in the middle of a circumferential extent of the inner rotor blade platform.

17. A rotor blade assembly comprising at least one rotor blade as recited in claim 1.

18. The rotor blade as recited in claim 4 wherein the straight end portions have a greater extent than the straight portions.

* * * * *